United States Patent [19]

Swindeman et al.

[11] Patent Number: 5,975,424
[45] Date of Patent: Nov. 2, 1999

[54] ELECTRIC CONTROL FOR ULTRASONIC VERTICAL ANTI-HAIL CANNON

[75] Inventors: James P. Swindeman; Bernard F. Swindeman, both of Deerfield; Gerald S. Banks, Ann Arbor, all of Mich.

[73] Assignee: Hail Bangers, Inc., Deerfield, Mich.

[21] Appl. No.: 09/041,648

[22] Filed: Mar. 13, 1998

Related U.S. Application Data

[60] Provisional application No. 60/040,524, Mar. 14, 1997.

[51] Int. Cl.$^6$ ................................................ A01G 15/00
[52] U.S. Cl. .......................... 239/2.1; 239/14.1; 239/99
[58] Field of Search ................................. 239/2.1, 14.1, 239/99

[56] References Cited

U.S. PATENT DOCUMENTS 5,381,955  1/1995  Olivier ................................. 239/14.1
5,411,209  5/1995  Olivier ................................. 239/14.1
5,445,321  8/1995  Olivier ................................. 239/14.1

*Primary Examiner*—Lesley D. Morris
*Attorney, Agent, or Firm*—James M. Deimen

[57] ABSTRACT

A new control circuit for firing an ultrasonic vertical anti-hail cannon on a repeated basis from a remote location. The control circuit employs a micro-controller with electrically erasable programmable read only memory and random access memory. When main power is provided the program is read from memory and several safety tests are run before the program goes into a routine that provides for repeated cannon firings. In the preferred embodiment a telephone pager is employed in the control circuit to enable repeated cannon fire by merely paging the cannon from a remote location. Likewise, the repeated cannon fire can be halted by paging the control circuit. The control circuit employs certain safety protocols to minimize the likelihood of inadvertent cannon fire and to permit manual firing and servicing of the cannon.

19 Claims, 4 Drawing Sheets

5,975,424

ELECTRIC CONTROL FOR ULTRASONIC VERTICAL ANTI-HAIL CANNON

BACKGROUND OF THE INVENTION

This application is a complete application based on provisional patent application Ser. No. 60/040,524, filed Mar. 14, 1997.

The field of the invention pertains to devices that perturb the formation of hailstones in thunderstorms and, in particular, to devices that produce shock waves traveling into and through thunderstorms as they are forming.

U.S. Pat. No. 5,445,321 discloses a device comprising a vertical cannon and an electric control circuit to cause repeated, timed explosions in the combustion chamber of the cannon. The repeated and focused explosions cause shock waves to be propelled from ground level upward through the forming thunder-head thereby disturbing the formation of hail nuclei and preventing or substantially lessening formation of damaging hailstones.

SUMMARY OF THE INVENTION

The invention comprises a new control circuit for firing the cannon on a repeated basis from a remote location. The control circuit employs a micro-controller such as PIC16C57 with 2K of electrically erasable programmable read only memory (EEPROM) and 32 bytes of random access memory. When the main power switch is actuated the program is read from memory and several safety tests are run before the program goes into a routine that provides for repeated cannon firings.

In the preferred embodiment a telephone pager is employed in the control circuit to enable the cannon to be caused to fire repeatedly by merely paging the cannon from a remote location. The cannon can likewise be caused to cease firing by paging the control circuit. The control circuit employs certain safety protocols to minimize the likelihood of inadvertent firing of the cannon and to permit manual firing and servicing of the cannon.

DESCRIPTION OF THE PREFERRED EMBODIMENT

Figure 1:
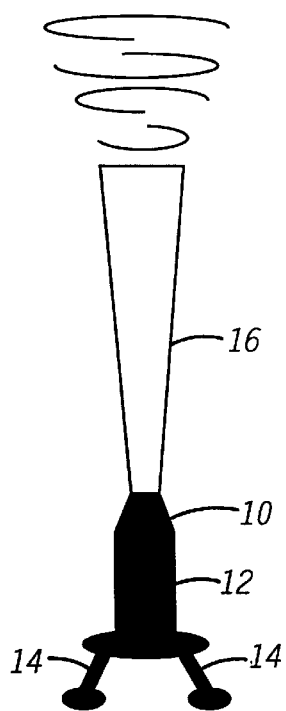
FIG. 1 is a schematic side view of a cannon.

FIG. 1 illustrates in side view an anti-hail cannon 10 comprising a combustion chamber 12 resting on legs 14 and surmounted by a vertical horn 16. Explosions are periodically ignited in the combustion chamber 12 using a fuel such as acetylene in a mix with air. The explosions create shock waves which travel upwardly through the horn 16. The horn 16 focuses the shock waves thereby enabling the shock waves to travel thousands of feet vertically. Typically, the explosions are about 5–10 seconds apart for several minutes.

Figure 2:
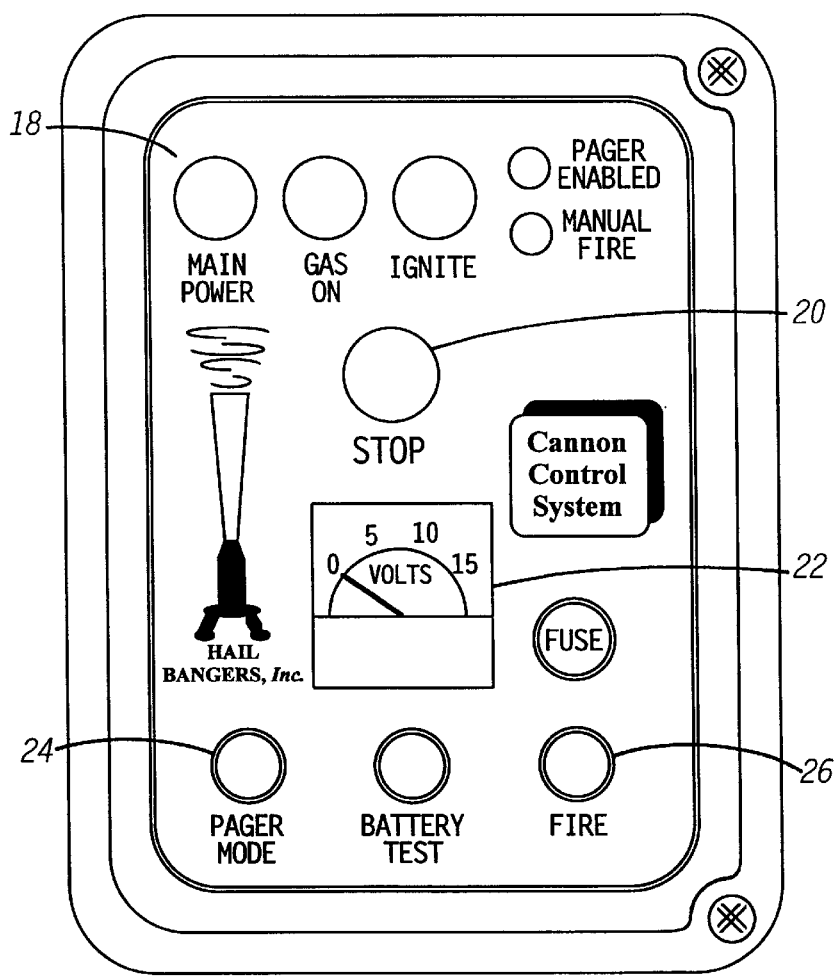
FIG. 2 is a view of a control panel for the cannon.

In FIG. 2 across the top of the control panel 18 are a plurality of indicator lights comprising light emitting diodes (LEDs). The LEDs indicate from left to right that main power is on, gas (fuel) is on, ignition coil is on, pager is enabled and the control is set for manual firing. Below the LEDs at the center is the main power and emergency stop button 20 for the entire cannon control system.

Across the bottom of the panel 18 from left to right is a plurality of control buttons to toggle the pager mode, test the battery and manually fire the cannon. Centered above the battery test button is a meter 22 for battery voltage. Since anti-hail cannons are intended to be placed in the field generally at some distance from inhabited structures, a solar battery charger is a suitable means of assuring long battery life without frequent battery recharging.

Figure 3:
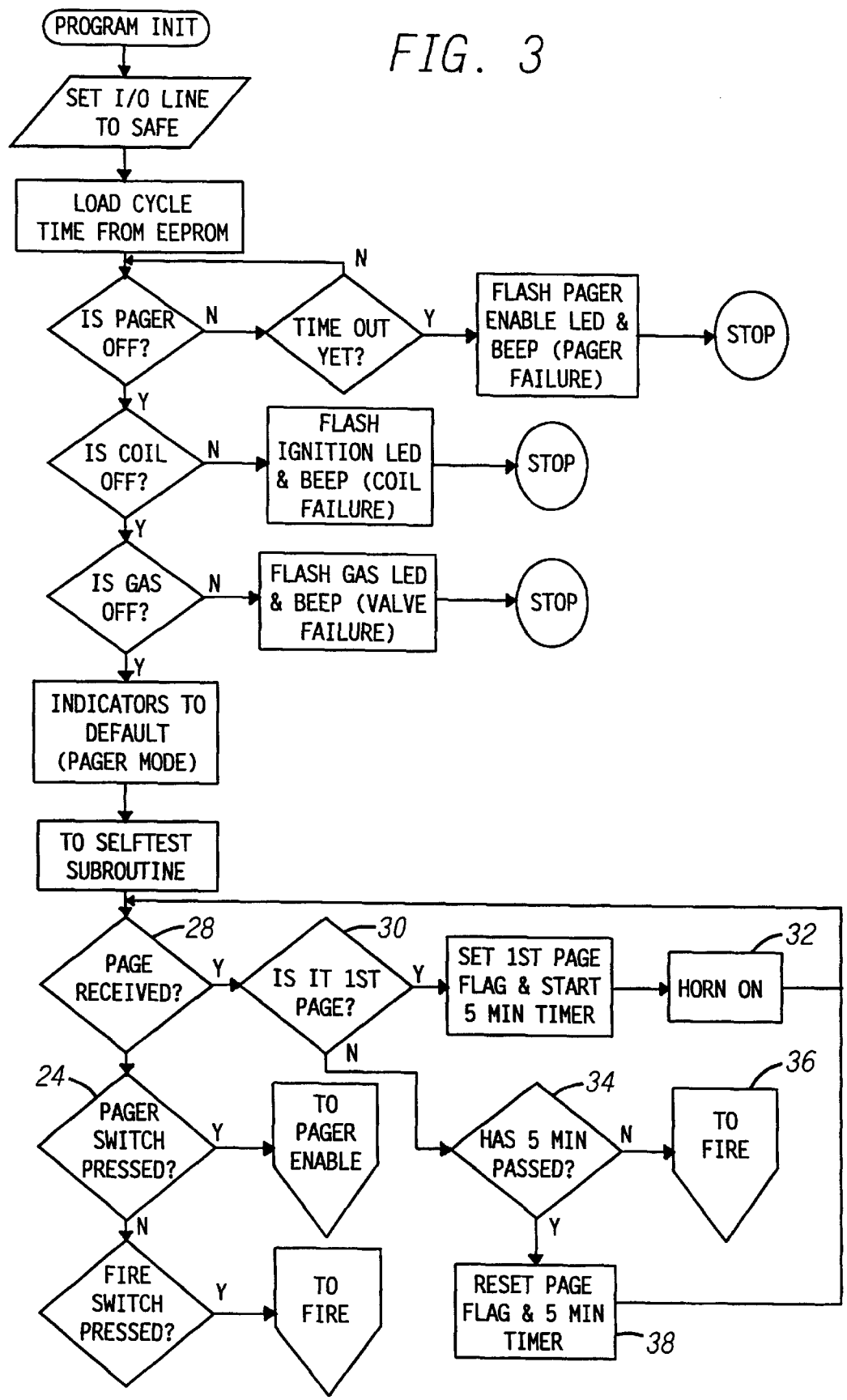
FIG. 3 is a flow chart for the main routine program of the control circuit.

Referring to the flow-diagram of FIG. 3 actuation of the main power button 20 of the device will cause program initiation from a previous state of complete shut down. The input/output lines to the microprocessor are set to safe and the software program booted up from the EEPROM. The program then checks the status of the pager, ignition coil and gas. In the event that any of the three is not off, the corresponding LED flashes and a ceramic buzzer or alarm sounds, followed by shut down of the control for servicing.

Figure 5:
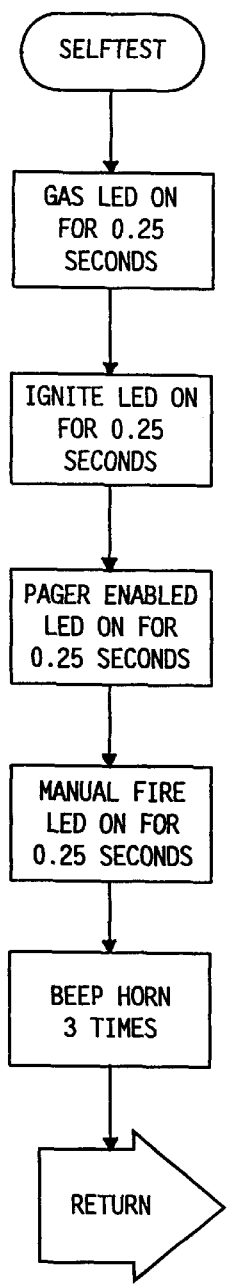
FIG. 5 is a flow chart for the self test subroutine of the control circuit.

The program normally then enters a self test routine as shown in FIG. 5 wherein the gas, ignition coil, pager enabled and manual fire LEDs momentarily light in sequence followed by three beeps produced by the ceramic buzzer or alarm. The program then enters the pager enabled mode and awaits an input from the control panel or a page output from the pager.

Figure 6:
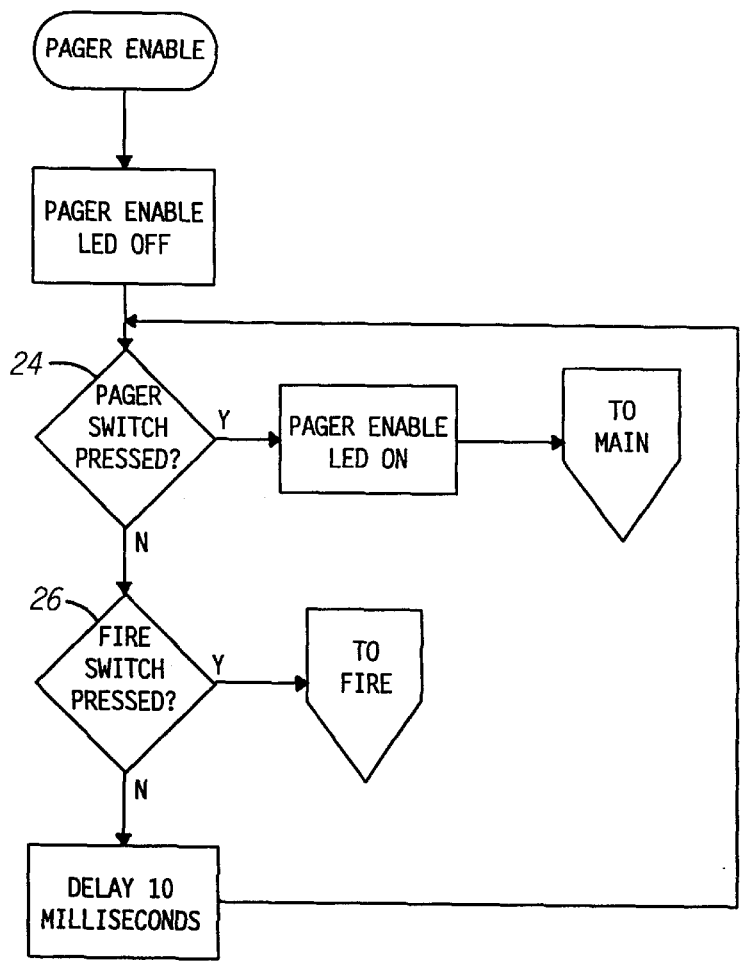
FIG. 6 is a flow chart for the pager enable subroutine of the control circuit.

If the pager mode button 24 is pressed, the program will toggle to the pager disable mode to prevent inadvertent firing and the pager enable LED will be extinguished on the control panel 18 as indicated in FIG. 6. Thus, the pager can be disabled without shutting down the main routine program in the microprocessor. The cannon 10 can be fired manually with the fire button 26. Otherwise, the pager enable subroutine of FIG. 6 cycles with a ten millisecond delay until such time as the pager mode button 26 is again pressed to relight the pager enable LED and toggle back to the main routine program of FIG. 3.

In FIG. 3 the pager continuously monitors for an incoming page at 28 and upon receipt of a first page at 30 begins a timer and sounds the alarm horn at 32 to warn that the cannon will begin firing shortly. Upon receipt of a second page within the specified time period (here 5 minutes) at 34, the cannon is directed to begin firing at 36. Otherwise, the timer is reset as shown at 38.

As further described below, the cannon will cease firing upon paging the control twice within a specified time (here 15 minutes). Otherwise, the cannon will continue to fire until the fuel is exhausted.

Figure 4:
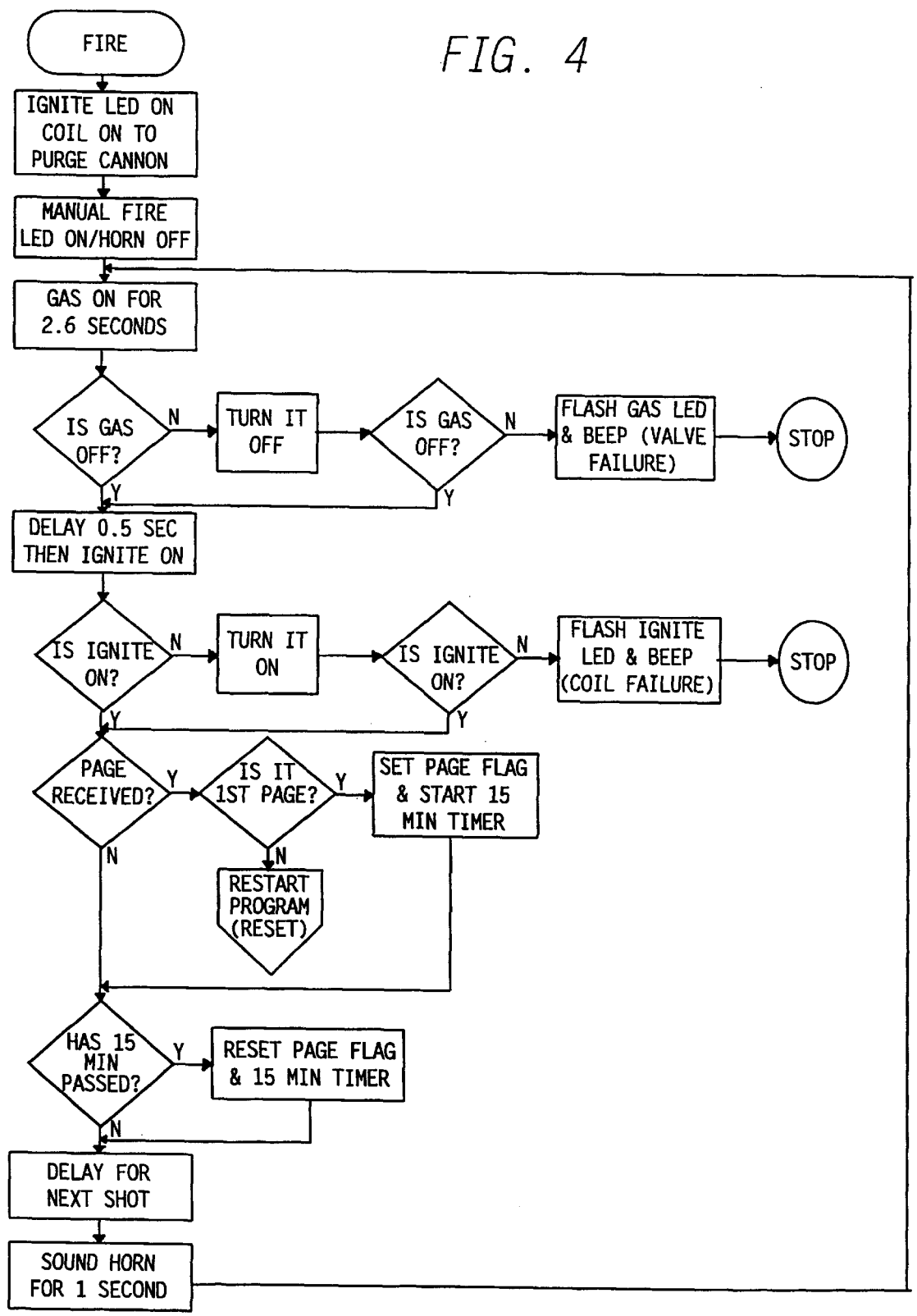
FIG. 4 is a flow chart for the fire routine program of the control circuit.

Referring to FIG. 4 upon actuation of the manual fire button 26 or double page 34 the firing sequence begins. The ignition coil is first turned on to purge the cannon and sound the alarm horn. Subsequently, the fuel is turned on for a length of time sufficient to create the proper air fuel ratio (here 2.6 seconds). After a check to confirm that the fuel is shut off and delay (here 0.5 seconds) is imposed, the ignition coil is turned on and the cannon fires. To assure firing, the ignition coil "on" is confirmed and then ignition coil "off" is confirmed.

The firing sequence then enters a pager check for a double page within a specified time period (here 15 minutes) to determine whether the cannon is to continue firing. If two pages are not received within the specified time period for ceasing firing, the cycle is delayed for a specified time which may be on the order of 25–30 seconds depending on the cooling rate of the cannon combustion chamber and on weather conditions. The alarm horn then sounds to warn of the next shot and the cycle begins again by admitting fuel to the combustion chamber.

In the preferred embodiment the ignition coil circuit when on is caused to pulse at a frequency of 70.5 Hertz for 0.5 seconds thereby generating about 30 to 35 sparks in the combustion chamber. The 0.5 seconds burst is repeated after a delay of 0.5 seconds to insure that all of the air fuel mixture in the combustion chamber is ignited.

Thus, in normal operation the new control circuit will cause the cannon to begin firing at a remote location upon receipt of two pages within a specified time period. The cannon will repeatedly fire until either the fuel supply is exhausted or a pair of pages are received within the shut off specified time period. In the event of fuel valve failure or ignition coil failure, the firing sequence halts, the gas or ignition LED flashes and the alarm sounds for servicing.

We claim:

1. An anti-hail cannon control comprising means to electrically ignite a fuel-air mixture,
   means to remotely activate and deactivate the electrical ignition means,
   means to assure that a suitable fuel-air mixture has been admitted to the cannon and,
   means to assure that the electrical ignition means is operable.

2. The anti-hail cannon control of claim 1 including means to continuously monitor for an instruction to begin the firing sequence.

3. The anti-hail cannon control of claim 2 wherein the monitoring means delays the firing sequence until a second instruction is received within a specified time period from the first instruction.

4. The anti-hail cannon control of claim 1 including pager means to remotely activate and deactivate the electrical ignition means.

5. The anti-hail cannon control of claim 4 including means to initially check the fuel supply means, the electrical ignition means and the pager means.

6. The anti-hail cannon control of claim 4 including means to manually fire the cannon and means to disable the pager means for manual firing.

7. The anti-hail cannon control of claim 4 wherein said pager means requires a pair of pages within a specified time period to activate the electrical ignition means for cannon firing.

8. The anti-hail cannon control of claim 4 wherein said pager means requires a pair of pages within a specified time period to deactivate the electrical ignition means and cease cannon firing.

9. The anti-hail cannon control of claim 4 including means to purge the cannon and sound an alarm.

10. A method for firing an anti-hail cannon from a remote location comprising the steps of initiating a pager monitoring cycle, and, paging the cannon control a plurality of times within a specified time period to cause the cannon to begin firing.

11. The method of claim 10 including the step of paging the cannon control a plurality of times within a specified time period to cause the cannon to cease firing.

12. The method of claim 10 including the steps of testing the fuel supply to the cannon and the electrical ignition for the cannon prior to initiating the pager monitoring cycle.

13. The method of claim 10 including the steps of purging the cannon and sounding an alarm prior to firing the cannon.

14. An anti-hail cannon and control comprising a combustion chamber surmounted by a horn in fluid communication with the combustion chamber, means to supply fluid fuel to the combustion, said fuel supply means chamber incorporating a valve,
   means to assure that a suitable fuel-air mixture has been admitted to the combustion chamber,
   means to electrically ignite a fuel-air mixture in the combustion chamber,
   means to assure that the electrical ignition means is operable, and
   means to remotely activate and deactivate the electrical ignition means.

15. The anti-hail cannon and control of claim 14 including pager means to activate and deactivate the electrical ignition and the valve.

16. The anti-hail cannon and control of claim 15 including means to initially check the fuel supply means, the electrical ignition means and the pager means.

17. The anti-hail cannon and control of claim 15 including means to manually fire the cannon and means to disable the pager means for manual firing.

18. The anti-hail cannon and control of claim 15 including means to purge the combustion chamber and sound an alarm.

19. The anti-hail cannon and control of claim 15 wherein the control includes a microprocessor and memory, and a computer program adapted to test the fuel supply means and the electrical ignition means and to monitor the pager means for incoming pages.

* * * * *